3,089,560
CONTROL MECHANISM FOR MOTOR VEHICLES
Jefferson J. Priest, 1468 Burr St., Fairfield, Conn.
Filed Aug. 25, 1960, Ser. No. 51,849
1 Claim. (Cl. 180—77)

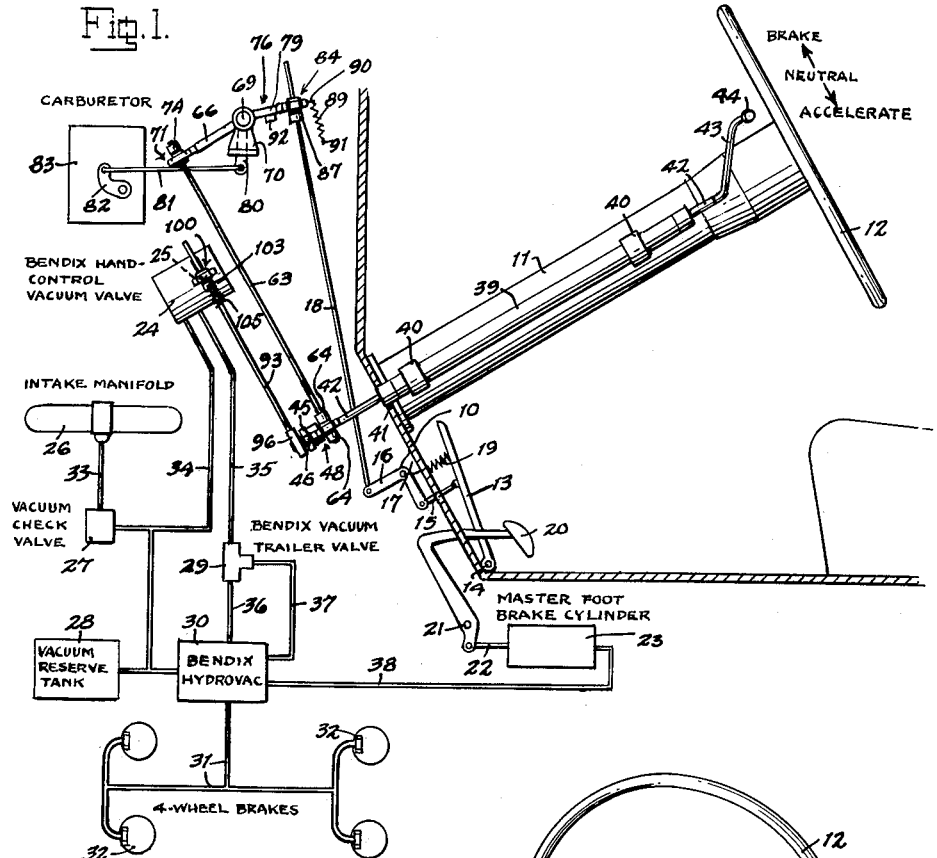

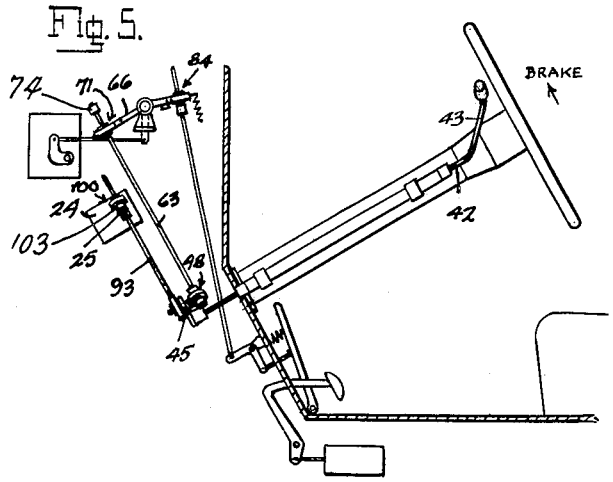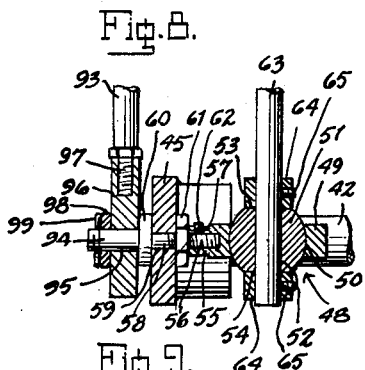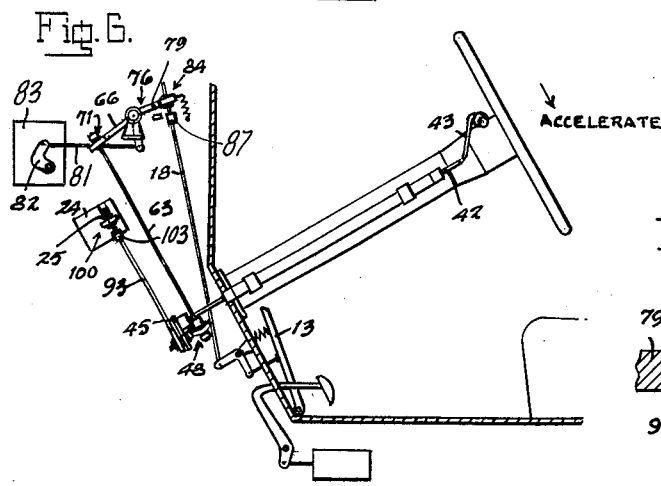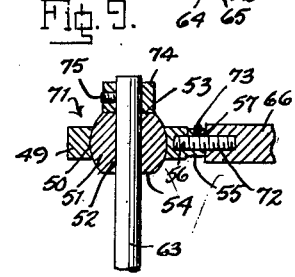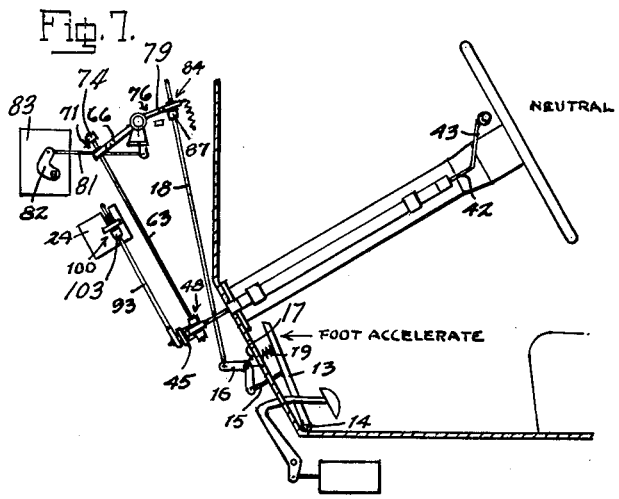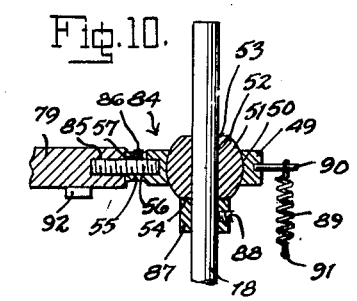
INVENTOR.
JEFFERSON J. PRIEST
ATTORNEY.

The present invention relates to operative controls for automobiles and particularly a cooperative mechanism including auxiliary hand control means for actuating the brake and accelerator systems independently of the normal foot operated brake and accelerator pedals. The invention enables operation of an automobile by persons who do not have the use of their lower limbs, as well as normal operation by the conventional use of the foot operated brake and accelerator pedals. The invention is particularly adapted for use in an automobile having an automatic transmission, which is operable through actuation of the accelerator, and a power brake system, which is subject to operation through the manual application of relatively slight pressure, thus making possible the hand operation of the power braking system with comparatively little effort.

An object of the invention is to provide a control mechanism which may either be provided as original equipment in an automobile or readily incorporated as an accessory, and in either case the exposed part of the mechanism will be inconspicuous and will in no way obstruct the leg space between the seat and the steering column. A further object is to provide a hand control mechanism having a single control lever disposed in such relation to the steering wheel that it may be operated by the fingers of one hand engaged upon the steering wheel through swinging movement in a plane parallel to the plane of the steering wheel, the lever normally occupying a neutral position from which it is movable in one direction for braking and in the other direction for accelerating.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claim.

In the drawings:
FIG. 1 is a view partially in vertical section and partially in side elevation as seen from the left of the driver, and showing in diagrammatic outline a power braking system, the control mechanism being in neutral position;
FIG. 2 is a perspective view, partially broken away, of the control mechanism, and also shown in neutral position;
FIG. 3 is a plan view on an enlarged scale of one of the universal slip joint units employed;
FIG. 4 is a sectional view taken along the line 4—4 of FIG. 3;
FIG. 5 is a side elevation, partially in vertical section and on a reduced scale, showing the hand control mechanism in its braking position;
FIG. 6 is a view similar to FIG. 5 showing the hand control mechanism in its accelerator operating position;
FIG. 7 is a view similar to FIG. 5 showing the foot accelerator pedal in its accelerator operating position;
FIG. 8 is an enlarged detailed sectional view taken along the line 8—8 of FIG. 2;
FIG. 9 is an enlarged detailed sectional view taken along line 9—9 of FIG. 2;
FIG. 10 is an enlarged detailed sectional view taken along the line 10—10 of FIG. 2; and
FIG. 11 is an enlarged detailed sectional view taken along the line 11—11 of FIG. 2.

Referring to the drawings the automobile as illustrated is provided with the conventional inclined floor board section 10 upon which the steering column 11 is mounted with its axis normal to the inclined floor board section, and upon the outer end of which there is mounted the conventional steering wheel 12. The foot accelerator pedal 13 is pivoted at 14 and is connected by a link 15 extending through the floor board section 10 to a bell crank lever 16 pivotally mounted upon a bracket 17 and adapted to operate the accelerator through a rod 18, as will presently more fully appear. A compression spring 19 normally maintains the accelerator pedal in its neutral position.

The foot brake pedal 20 pivotally mounted at 21 extends through the floor board section 10 in the conventional manner, and through a rod 22 is adapted to actuate the master foot brake cylinder 23 of the power braking system in the usual manner. In addition to the master foot brake cylinder the power brake system includes a hand control vacuum valve 24, shown by way of example as a "Bendix" valve provided with an operating lever 25, and through which the system may be operated independently of the master foot brake cylinder. The power brake system, illustrated by way of example, also includes the intake manifold 26 of the internal combustion engine (not shown), a vacuum check valve 27, a vacuum reserve tank 28, a "Bendix" vacuum trailer valve 29 and a "Bendix Hydrovac" unit 30, the latter being connected through pipe lines 31 to the four wheel brake cylinders 32 for applying the brakes. A pipe line 33 connects the intake manifold to the vacuum check valve 27, a pipe line 34 has branch connections to the vacuum check valve 27, the hand controlled vacuum valve 24, the vacuum reserve tank 28, and the "Bendix Hydrovac" unit 30. A pipe line 35 connects the hand controlled vacuum valve 24 to the "Bendix" vacuum trailer valve 29, and the latter is connected by pipe lines 36 and 37 to the "Bendix Hydrovac" unit. A pipe line 38 connects the master foot brake cylinder 23 to the "Bendix Hydrovac" unit 30.

While the hand control means may be disposed in relation to the steering wheel 12 so that it may be operated by the left hand or by the right hand, depending upon the choice of the operator, it is shown in its relation for operation by the left hand. In this relationship a tubular bearing 39 is mounted upon the left hand side of the steering column 11 in parallel relation thereto by means of suitable brackets 40 secured to the steering column, the lower end of the bearing tube being extended through an aperture 41 in the floor board section 10 and the upper end being spaced downwardly from the steering wheel 12. Within the bearing tube 39 there is rotatably mounted a shaft 42 provided at its upper end with a manual control handle extension 43 suitably bent so that a knob 44 upon its terminal end is in such proximity to the steering wheel 12 that it may be conveniently engaged by the fingers of the left hand resting upon the steering wheel and moved either upwardly or downwardly to rotate the shaft 42 in one direction or the other, upward movement actuating the brake system and downward movement actuating the carburetor accelerating system.

The lower end of the shaft 42 extends into the engine compartment and has mounted thereon a lever arm 45 which extends from the same side of the shaft as the operating handle extension 43, so that when the handle extension is pressed upwardly or downwardly the lever arm 45 is correspondingly swung upwardly or downwardly. An exansion spring 46 is connected between the end of the lever arm 45 and a suitable fixed point 47 and normally positions the lever arm 45 and the handle extension 43 in neutral position and returns them to neutral position following upward or downward movement.

On one side of the lever 45 there is mounted a universal joint unit 48, preferably of the type illustrated in FIGS. 3 and 4, and which comprises a ring member 49 provided with an inner spherical surface 50 rotatably engaged by a ball member 51 having a diametric cylindrical passage 52 therethrough, the upper and lower surfaces of the ball member at the ends of the passage 52 being flattened as at 53 and 54. A radially projecting mounting hub 55 is provided upon the ring member 49 and is provided with a threaded hole 56 for receiving a mounting screw stud and a threaded hole 57 for receiving a set screw to prevent rotation upon the stud.

As shown in FIG. 8 the universal joint unit 48 is screwed upon a threaded stud 58 engaged through a transverse hole 59 in the lever 45 and secured to the lever by a flange 60 engaged with one side of the lever and a nut 61 screwed upon the stud and engaged with the other side of the lever. The joint unit is secured against rotation upon the threaded stud by a set screw 62 screwed in the threaded hole 57. A pull rod 63 is engaged in the passage 52 of the ball member 51 and is secured against longitudinal movement by a pair of collars 64—64 respectively engaged with the upper and lower flat surfaces 53 and 54 of the ball member and secured by set screws 65—65.

The upper end of the rod 63 has a pull and slip connection with an operating lever 66 having a hub 67 secured by a set screw 68 upon a rock shaft 69 journalled in suitable bearing brackets 70—70. The pull and slip connection comprises a universal joint unit 71, similar to the joint unit 48, and shown in detail in FIGS. 3 and 4. As seen in FIG. 9 the joint unit is screwed upon a threaded stud 72 provided upon the end of the lever 66 and is secured by a set screw 73. The rod 63 is slidably engaged in the passage 52 of the ball member 51 and upon its upper end a collar 74 is secured by a set screw 75 and normally engages the upper flat surface 53 of the ball member, so that upon downward movement the rod 63 pulls the lever 66 downwardly and upon movement it slides freely in the joint unit without imparting movement to the lever. Also upon the rock shaft 69 there is secured a bell crank lever 76 comprising a hub portion 77 secured by a set screw 78 to the rock shaft and a pair of arms 79 and 80, the arm 80 being connected by a rod 81 to the accelerator lever 82 of the carburetor 83.

Upon the end of the arm 79 there is secured a universal joint unit 84 similar to the joint units 48 and 71, and shown in detail in FIGS. 3 and 4, and through which the foot accelerator pedal 13 is operatively connected to the accelerator lever 82 of the carburetor. As shown in detail in FIG. 10 the joint unit 84 is screwed upon a threaded stud 85 provided upon the end of the arm 79 and is secured by a set screw 86. The rod 18 which extends from the bell crank lever 16 has a thrust and slip connection with the joint unit 84, and to this end is slidably engaged in the passage 52 of the ball member 51 and has a collar 87 secured thereon by a set screw 88 at the lower side of the ball member to normally engage the lower flat surface 54 of the ball member. An expansion spring 89 is connected between a pin 90 secured upon the outer end of the joint unit 84 and a fixed point 91 and normally positions the arm 79 against a stop 92. Upward movement of the rod 18 pushes the bell crank lever 76 in counter-clockwise direction to actuate the accelerator lever 82 of the carburetor, the operating lever 66 at the same time slipping freely downwardly upon the rod 63. Conversely, as the rod 63 is moved downwardly through pressing downwardly upon the hand control handle 43 the rock shaft and the bell crank lever 76 are rotated in counter-clockwise direction to actuate the accelerator lever 82 and at the same time the arm 79 of the bell crank lever slips freely upwardly upon the rod 18.

Upon the opposite side of the lever 45 from the joint unit 48 there is pivotally connected the lower end of a brake system actuating rod 93. As shown in detail in FIG. 8, a shaft extension 94 of the threaded stud 58 is engaged in a hole 95 of a bearing member 96 into which the lower threaded end 97 of the rod 93 is screwed, the bearing member being retained upon the shaft extension 94 by a washer 98 and a cotter pin 99. The upper end of the rod 93 has a thrust and slip connection with the lever 25 of the hand control vacuum valve 24.

This thrust and slip connection comprises a universal joint unit 100, similar to the joint units 48, 71 and 84, and shown in detail in FIGS. 3 and 4. As seen in FIG. 11, the joint unit is screwed upon a threaded stud 101 provided upon the end of the lever 25 and is secured by a set screw 102. The rod 93 is slidably engaged in the passage 52 of the ball member 51 and has a collar 103 secured thereon by a set screw 104 at the lower side of the ball member to normally engage the lower flat surface 54 of the ball member. An expansion spring 105 is connected between a pin 106 and a fixed point 107 and normally positions the lever 25 against a stop 108. Upward movement of the rod 93 pushes the lever 25 upwardly to actuate the braking system, while upon downward movement the rod slides freely in the ball member 51.

As seen in FIG. 5 the hand control handle 43 is moved upwardly into braking position. As a result the lever 45 is moved upwardly from its neutral position causing the rods 93 and 63 to be moved upwardly, the upward movement of the rod 93 causing the brake actuating lever 25 to be pushed upwardly to actuate the braking system, while the upwardly moving rod 63 slips freely with respect to the operating lever 66.

As seen in FIG. 6 the hand control handle 43 is moved downwardly from its neutral position to actuate the accelerator. As a result the lever 45 moves downwardly causing the rods 63 and 93 to be moved downwardly, the downward movement of the rod 63 pulling the operating lever 66 and the bell crank lever 76 in counter-clockwise direction to actuate the accelerator lever 82 of the carburetor while the downwardly moving rod 93 slips freely with respect to the lever 25. As the bell crank lever is actuated by the hand control handle 43 the arm 79 slips freely upwardly with respect to the rod 18 without imparting movement thereto, so that there is no transmitted movement to the foot accelerator pedal 13.

As seen in FIG. 7 the foot accelerator pedal 13 is depressed causing the rod 18 to be moved upwardly to thus impart counter-clockwise movement to the bell crank lever 76 to actuate the accelerator lever 82 of the carburetor. During this foot operation of the accelerator lever 82 the operating lever 66 slips freely downwardly with respect to the rod 63 so that there is no transmitted movement to the hand control handle 43.

What is claimed is:

In a control mechanism for motor vehicles having a steering column, a steering wheel, a carburetor accelerating system, and a power braking system including a control valve, the combination comprising a rotatable shaft disposed in generally parallel relation along one side of said steering column, a lever handle secured to the upper end of said shaft and extending laterally therefrom into proximity to the outer periphery of said steering wheel, a lever arm secured to the lower end of said shaft extending laterally in one direction therefrom and having swinging movement in opposite directions from a neutral position in response to rotary movement of said shaft imparted through swinging movement of said lever handle in opposite directions from a neutral position, a pair of rods pivotally connected to the outer end of said lever arm extending in the same direction therefrom whereby swinging movement of said lever arm in opposite directions respectively imparts longitudinal thrust and pull movement to both said rods in the same direction, an operating lever for said carburetor accelerating system, an operating lever for said control valve, pull and slip connection means between one rod and one of said operating levers which is inoperative in the thrust direction of movement of said one rod, and thrust and slip connection means between the other rod and the other of said operating levers which is inoperative in the pull direction of movement of said other rod.

References Cited in the file of this patent
UNITED STATES PATENTS

| | | |
|---|---|---|
| 1,620,763 | Hull | Mar. 15, 1927 |
| 1,748,041 | Backhus | Feb. 18, 1930 |
| 2,179,368 | Baade | Nov. 7, 1939 |
| 2,226,591 | Swenson et al. | Dec. 31, 1940 |